United States Patent
Bhandari et al.

(10) Patent No.: US 10,324,108 B2
(45) Date of Patent: Jun. 18, 2019

(54) DYNAMIC OFFSET CORRECTION FOR CALIBRATION OF MEMS SENSOR

(71) Applicant: mCube, Incorporated, San Jose, CA (US)

(72) Inventors: Sanjay Bhandari, San Jose, CA (US); Joe Kelly, North Liberty, IA (US)

(73) Assignee: mCube, Inc., San Jose, CA (US)

( * ) Notice: Subject to any disclaimer, the term of this patent is extended or adjusted under 35 U.S.C. 154(b) by 820 days.

(21) Appl. No.: 13/760,014

(22) Filed: Feb. 5, 2013

(65) Prior Publication Data
US 2013/0218505 A1 Aug. 22, 2013

Related U.S. Application Data

(60) Provisional application No. 61/596,189, filed on Feb. 7, 2012.

(51) Int. Cl.
*G01P 21/00* (2006.01)
*G01C 25/00* (2006.01)
(Continued)

(52) U.S. Cl.
CPC ............ *G01P 21/00* (2013.01); *G01C 25/005* (2013.01); *G01C 21/08* (2013.01); *G01C 21/10* (2013.01);
(Continued)

(58) Field of Classification Search
CPC ........ G01P 15/14; G01P 15/18; G01P 15/135; G01P 21/00; G01C 25/00; G01C 25/005; G01C 21/10; G01C 21/08
(Continued)

(56) References Cited

U.S. PATENT DOCUMENTS 6,421,622 B1 7/2002 Horton et al.
7,210,236 B2 5/2007 Sato et al.
(Continued)

FOREIGN PATENT DOCUMENTS

CN 101033973 9/2007
CN 201311294 9/2009
(Continued)

OTHER PUBLICATIONS

*Electric Power Group* v. *Alstom.* Aug. 1, 2016, 12 Pages.
(Continued)

*Primary Examiner* — Sujoy K Kundu
*Assistant Examiner* — Lynda Dinh
(74) *Attorney, Agent, or Firm* — Richard T. Ogawa; Ogawa P.C.

(57) ABSTRACT

A hand-held processor system for processing data from an integrated MEMS device disposed within a hand-held computer system and method. A dynamic offset correction (DOC) process computes 3-axis accelerometer biases without needing to know the orientation of the device. Arbitrary output biases can be corrected to ensure consistent performance A system of linear equations is formed using basic observations of gravity measurements by an acceleration measuring device, conditioned upon constraints in data quality, degree of sensed motion, duration, and time separation. This system of equations is modified and solved when appropriate geometric diversity conditions are met.

30 Claims, 2 Drawing Sheets

(51) Int. Cl.
*G01P 15/135* (2006.01)
*G01C 21/10* (2006.01)
*G01C 21/08* (2006.01)
*G01P 15/14* (2013.01)
*G01P 15/18* (2013.01)

(52) U.S. Cl.
CPC ............ *G01P 15/135* (2013.01); *G01P 15/14* (2013.01); *G01P 15/18* (2013.01)

(58) Field of Classification Search
USPC .................................................. 702/104, 116
See application file for complete search history.

(56) References Cited

U.S. PATENT DOCUMENTS

| | | | |
|---|---|---|---|
| 7,578,189 | B1 | 8/2009 | Mehregany |
| 8,676,528 | B2 * | 3/2014 | Almalki ................. G01C 17/28 702/96 |
| 8,904,410 | B2 | 12/2014 | Kelly |
| 9,052,203 | B2 | 6/2015 | Kelly |
| 9,179,248 | B2 | 11/2015 | Kelly et al. |
| 9,179,266 | B2 | 11/2015 | Kelly |
| 9,594,095 | B2 | 3/2017 | Bhandari et al. |
| 2002/0065626 | A1 | 5/2002 | McCall et al. |
| 2003/0065467 | A1 | 4/2003 | Schuh et al. |
| 2003/0135327 | A1 | 7/2003 | Levine et al. |
| 2005/0184884 | A1 * | 8/2005 | Kim ........................ G06F 3/017 341/22 |
| 2005/0284221 | A1 | 12/2005 | Danisch |
| 2007/0073482 | A1 | 3/2007 | Churchill |
| 2009/0145195 | A1 | 6/2009 | Buttmann et al. |
| 2009/0254294 | A1 | 10/2009 | Dutta |
| 2009/0259424 | A1 | 10/2009 | Dutta |
| 2010/0242603 | A1 | 9/2010 | Miller et al. |
| 2011/0029275 | A1 | 2/2011 | Kennedy et al. |
| 2011/0191024 | A1 | 8/2011 | Deluca |
| 2011/0265574 | A1 | 11/2011 | Yang |
| 2011/0288805 | A1 | 11/2011 | Dejnabadi et al. |
| 2011/0301900 | A1 | 12/2011 | Patel et al. |
| 2011/0307171 | A1 | 12/2011 | Waite |
| 2011/0313650 | A1 | 12/2011 | Tomé |
| 2012/0136573 | A1 | 5/2012 | Janardhanan et al. |
| 2012/0136579 | A1 | 5/2012 | Janardhanan et al. |
| 2012/0203453 | A1 | 8/2012 | Lundquist et al. |
| 2012/0215477 | A1 | 8/2012 | Tuck et al. |
| 2013/0018582 | A1 | 1/2013 | Miller et al. |
| 2013/0090881 | A1 * | 4/2013 | Janardhanan ........ G01C 22/006 702/104 |
| 2013/0110450 | A1 | 5/2013 | Kulik |
| 2013/0124127 | A1 | 5/2013 | Ahuja et al. |
| 2013/0214357 | A1 | 8/2013 | Van Der et al. |
| 2013/0218505 | A1 | 8/2013 | Bhandari et al. |
| 2014/0343885 | A1 | 11/2014 | Abrahamsson et al. |

FOREIGN PATENT DOCUMENTS

| | | |
|---|---|---|
| EP | 1953513 | 8/2008 |
| JP | 2009025012 | 2/2009 |
| KR | 20120126120 | 11/2012 |
| WO | 2011091083 | 7/2011 |
| WO | 2011123149 | 10/2011 |

OTHER PUBLICATIONS

U.S. Appl. No. 13/761,748, Non-Final Office Action dated Feb. 26, 2015, 12 pages.
U.S. Appl. No. 13/761,748, Notice of Allowance dated Sep. 16, 2015, 9 pages.
U.S. Appl. No. 13/936,117, Final Office Action dated Aug. 5, 2016, 7 pages.
U.S. Appl. No. 13/936,117, Non-Final Office Action dated Mar. 29, 2016, 11 pages.
U.S. Appl. No. 13/936,117, Notice of Allowance dated Dec. 5, 2016, 8 pages.
U.S. Appl. No. 13/940,199, Final Office Action dated Jan. 17, 2017, 48 pages.
U.S. Appl. No. 13/940,199, Non-Final Office Action dated Jun. 16, 2016, 40 pages.
U.S. Appl. No. 14/550,888, Non-Final Office Action dated Apr. 4, 2017, 16 pages.
Chinese Application No. 201310049774.9, Office Action dated Dec. 20, 2016, 14 pages. (8 pages of English Translation and 6 pages of original document).
Non-Final Office Action received for U.S. Appl. No. 13/940,199, dated Aug. 11, 2017. 22 pages.
Final Office Action received for U.S. Appl. No. 14/550,888, dated Oct. 20, 2017. 18 pages.
Final Office Action received for U.S. Appl. No. 13/940,199, dated Jan. 11, 2018. 19 pages.
Non-Final Office Action received for U.S. Appl. No. 14/550,888, dated Mar. 7, 2018. 13 pages.
Non-Final Office Action received for U.S. Appl. No. 13/940,199, dated Sep. 28, 2018. 24 pages.
Restriction Requirement received in U.S. Appl. No. 13/761,748, dated Sep. 2, 2014. 5 pages.
Notice of Issuance received in Chinese Patent Application No. 201310049774.9, dated Aug. 14, 2017. 2 pages.
Notice of Allowance Received in U.S. Appl. No. 14/550,888, dated Oct. 1, 2018. 13 pages.
Non-Final Office Action received in U.S. Appl. No. 13/804,944, dated Mar. 27, 2015. 12 pages.
Notice of Allowance received in U.S. Appl. No. 13/804,944, dated Jul. 7, 2015. 10 pages.

* cited by examiner

DYNAMIC OFFSET CORRECTION FOR CALIBRATION OF MEMS SENSOR

CROSS-REFERENCES TO RELATED APPLICATIONS

The present application claims priority to and incorporates by reference, for all purposes, the following patent application: U.S. Pat. App. No. 61/596,189, filed Feb. 7, 2011 2012.

BACKGROUND OF THE INVENTION

The present invention is directed to applications of integrated circuit (IC) and MEMS (Micro-Electro-Mechanical-Systems) devices. More specifically, embodiments of the invention provide methods for improving calibration techniques for integrated MEMS devices and related structures, which can be implemented in mobile phones, tablets, hand-held computers, and the like. But it will be recognized that the invention has a much broader range of applicability.

Research and development in integrated microelectronics have continued to produce astounding progress in CMOS and MEMS. CMOS technology has become the predominant fabrication technology for integrated circuits (IC). MEMS, however, continues to rely upon conventional process technologies. In layman's terms, microelectronic ICs are the "brains" of an integrated device which provides decision-making capabilities, whereas MEMS are the "eyes" and "arms" that provide the ability to sense and control the environment. Some examples of the widespread application of these technologies are the switches in radio frequency (RF) antenna systems, such as those in the iPhone™ device by Apple, Inc. of Cupertino, Calif., and the Blackberry™ phone by Research In Motion Limited of Waterloo, Ontario, Canada, and accelerometers in sensor-equipped game devices, such as those in the Wii™ controller manufactured by Nintendo Company Limited of Japan. Though they are not always easily identifiable, these technologies are becoming ever more prevalent in society every day.

Beyond consumer electronics, use of IC and MEMS has limitless applications through modular measurement devices such as accelerometers, gyroscopes, actuators, and sensors. In conventional vehicles, accelerometers and gyroscopes are used to deploy airbags and trigger dynamic stability control functions, respectively. MEMS gyroscopes can also be used for image stabilization systems in video and still cameras, and automatic steering systems in airplanes and torpedoes. Biological MEMS (Bio-MEMS) implement biosensors and chemical sensors for Lab-On-Chip applications, which integrate one or more laboratory functions on a single millimeter-sized chip only. Other applications include Internet and telephone networks, security and financial applications, and health care and medical systems. As described previously, ICs and MEMS can be used to practically engage in various type of environmental interaction.

Although highly successful, ICs and in particular MEMS still have limitations. Similar to IC development, MEMS development, which focuses on increasing performance, reducing size, and decreasing cost, continues to be challenging. Additionally, applications of MEMS often require increasingly complex microsystems that desire greater computational power. Unfortunately, such applications generally do not exist. These and other limitations of conventional MEMS and ICs may be further described throughout the present specification and more particularly below.

From the above, it is seen that techniques for improving operation of integrated circuit devices and MEMS are highly desired.

BRIEF SUMMARY OF THE INVENTION

The present invention is directed to applications of integrated circuit (IC) and MEMS (Micro-Electro-Mechanical-Systems) devices. More specifically, embodiments of the invention provide methods for improving calibration techniques for integrated MEMS devices and related structures, which can be implemented in mobile phones, tablets, handheld computers, and the like. Merely by way of example, the MEMS devices can include at least an accelerometer, a gyroscope, a magnetic sensor, a pressure sensor, a microphone, a humidity sensor, a temperature sensor, a chemical sensor, a biosensor, an inertial sensor, and others. But it will be recognized that the invention has a much broader range of applicability.

In an embodiment, the present invention includes a microprocessor, microcontroller or computer implemented method for processing data from an integrated MEMS device disposed within a hand-held computer system programmed to perform the method. Calibration of sensor parameters, such as an accelerometer, and post-processing can be possible during normal operation. We can choose a time interval when there is no dynamic acceleration, as an accelerometer can sense when it is stationary regardless of orientation (e.g. it is not necessary that the device be in any particular position, such as horizontal, vertical, etc.). This static acceleration can be used for a dynamic offset calibration or dynamic offset correction or dynamic offset compensation (DOC) process.

The calibration can include monitoring existing X, Y, Z sensor outputs and ensuring that there is no change in these 3 axes data at consecutive time domain data measurements. An offset calibration can be calculated using multiple measurements, which can be obtained dynamically during normal operation. In a specific embodiment, gravity will be the only force measured. Measuring gravity in at least four significantly different directions, and the X, Y, Z offsets on the force sensor can be estimated.

In various embodiments, the dynamic offset correction computes 3-axis accelerometer biases without needing to know the orientation of the device. Arbitrary output biases can be corrected to ensure consistent performance. In a specific embodiment, each new valid 3-axis accelerometer measurement can be stored off for downstream computation of sensor biases, or a running record of the best subset of these measurements can be maintained to improve computational efficiency. In a specific embodiment, this selected subset contains three measurements, which allows a simple matrix inverse to be used to compute the biases from a matrix with dimension 3×3.

In various embodiments, a hand motion type calibration technique (used for e-compass calibration on cell phones) can also be used. Such hand motion type calibration techniques can include a figure eight motion, or other like motions. In a specific embodiment, the integrated MEMS device can include a multi-axis inertial system such as for example a 6-axis inertial sensor with a 3-axis gyroscope and a 3-axis accelerometer or 6-axis with 3-axis accelerometer and 3-axis magnetometer. During a hand motion calibration (e.g. figure eight) for the gyroscope, the accelerometer can also be gathering data points for calibration or other processes. Another specific embodiment of motion calibration includes device oriented at near-orthogonal orientations. For example, the accelerometer orientations can be held in orientation that approximately measure as 0, 0, 1 g; 1 g, 0, 0; 0, 1 g, 0; 0, 0, −1 g for X, Y, and Z axis respectively. Other types of user-initiated calibration processes will be recognized by those of ordinary skill in the art.

Many benefits are achieved by the way of the present invention over conventional techniques. From a user perspective, the DOC implementation can improve measurements to support high performance applications. A DOC process can be intentionally triggered by the user, or it can run in the background. This allows flexibility for the user or manufacturer of the device to determine what is the best fit with the intended usage and performance requirements. The procedural impact of implementation would be quite low, since many users already expect to calibrate a mobile device's magnetometer via a series of movements to achieve peak accuracy. The DOC process can also run in background where it will not need user to trigger calibration. The DOC can "auto-detect" when the calibration conditions are met. Additionally, this process can be made to consume very low power, as only an initial calibration routine and then a very low duty cycle maintenance task can be used to improve accuracy over time. Further, the calibration conditions can be modified during use to achieve an acceptable combination of quickness in initial convergence and ultimate accuracy. From a developer perspective, this implementation in a device can result in lower cost, since no elaborate in-factory calibration is required. This would eliminate the need for putting each part in a known orientation and taking measurements. The device can work regardless of any source or cause of biases.

Various additional objects, features and advantages of the present invention can be more fully appreciated with reference to the detailed description and accompanying drawings that follow.

BRIEF DESCRIPTION OF THE DRAWINGS

In order to more fully understand the present invention, reference is made to the accompanying drawings. Understanding that these drawings are not to be considered limitations in the scope of the invention, the presently described embodiments and the presently understood best mode of the invention are described with additional detail through use of the accompanying drawings in which.

DETAILED DESCRIPTION OF THE INVENTION

Figure 1:
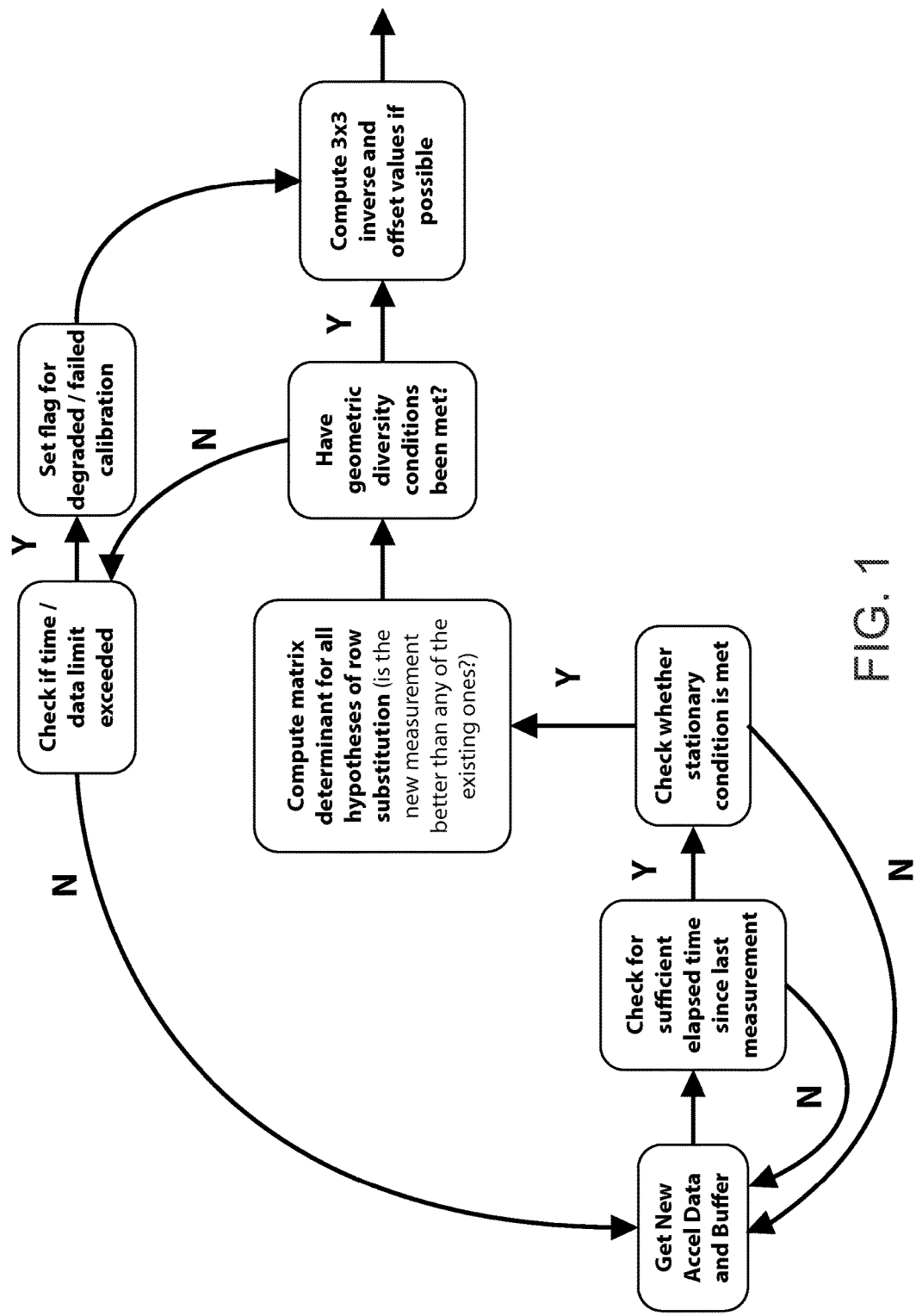
FIG. 1 is a simplified flow diagram of a method for calibrating an integrated MEMS device according to an embodiment of the present invention.

The present invention is directed to applications of integrated circuit (IC) and MEMS (Micro-Electro-Mechanical-Systems) devices. More specifically, embodiments of the invention provide methods and structures for improving calibration techniques for integrated MEMS devices, which can be implemented in mobile phones, tablets, hand-held computers, and the like. Merely by way of example, the MEMS devices can include at least an accelerometer, a gyroscope, a magnetic sensor, a pressure sensor, a microphone, a humidity sensor, a temperature sensor, a chemical sensor, a biosensor, an inertial sensor, and others. But it will be recognized that the invention has a much broader range of applicability.

In an embodiment, the present invention can include a microprocessor-implemented method for processing data from an integrated MEMS device disposed within a hand-held computer system programmed to perform the method. Calibration of sensor parameters, such as an accelerometer, and post-processing can be possible during normal operation. We can choose a time interval when there is no dynamic acceleration, as an accelerometer can sense when it is stationary regardless of orientation (e.g. it is not necessary that the device be in any particular position, such as horizontal, vertical, etc.). This static acceleration can be used for a dynamic offset calibration or dynamic offset correction (DOC) process.

The calibration can include monitoring existing X, Y, Z sensor outputs and ensuring that there is no change in these 3 axes data at consecutive time domain data measurements. An offset calibration can be calculated using multiple measurements, which can be obtained dynamically during normal operation. In a specific embodiment, gravity will be the only force measured. Using earth's gravity as a reference and measuring acceleration in at least four significantly different orientations of the device, we can estimate X, Y, Z offsets.

In an embodiment, X, Y, Z acceleration vectors ("measurement points") can be selected where the 'position' of the device is changed, implying 'static' acceleration in the X, Y, Z axes is different, but without dynamic acceleration, i.e., where gravity is the dominant acceleration component being sensed by the device. This can be determined using state machines in hardware or software. In various embodiments, minimum time separations may be imposed between samples to increase the likelihood that geometric conditions will be met in the measurement points without performing more computationally expensive screening operations, e.g. "200 ms required between measurement points."

Let $X_{mi}$, $Y_{mi}$, $Z_{mi}$ be the measured accelerations at instance i. Let $X_{off}$, $Y_{off}$, $Z_{off}$ be the offsets on each of the 3 axes, respectively. Let $X_{ai}$, $Y_{ai}$, $Z_{ai}$ be the actual accelerations, when the offsets on each axes are zero. Then, $$X_{mi}=X_{ai}+X_{off}$$

$$Y_{mi}=Y_{ai}+Y_{off}$$

$$Z_{mi}=Z_{ai}+Z_{off}$$

We know that in absence of dynamic acceleration, $$X_{ai}^2+Y_{ai}^2+Z_{ai}^2=1 \text{ g}^2$$

If we consider two sufficiently uncorrelated data samples during static acceleration (only acceleration due to gravity), then $$X_{a1}^2+Y_{a1}^2+Z_{a1}^2=1 \text{ g}^2$$

This implies $$(X_{m1}-X_{off})^2+(Y_{m1}-Y_{off})^2+(Z_{m1}-Z_{off})^2=1 \text{ g}^2$$

For another independent (uncorrelated) data point where no other component of acceleration other than earth's acceleration is present, $$X_{a2}^2+Y_{a2}^2+Z_{a2}^2=1 \text{ g}^2$$

$$(X_{m2}-X_{off})^2+(Y_{m2}-Y_{off})^2+(Z_{m2}-Z_{off})^2=1 \text{ g}^2$$

Subtracting, $$(X_{m1}^2-X_{m2}^2)-2*X_{off}(X_{m1}-X_{m2})+(Y_{m1}^2-Y_{m2}^2)-2*Y_{off}(Y_{m1}-Y_{m2})+(Z_{m1}^2-Z_{m2}^2)-2*Z_{off}(Z_{m1}-Z_{m2})=0$$

Taking 3 or more pairs of data based on measurements, we can solve for $X_{off}$, $Y_{off}$ and $Z_{off}$. This offset can then be subtracted from each measured data from that point onwards. The differencing operation allows the calculations to be insensitive to the actual value of gravity. Having uncorrelated pairs of data is preferred since the 3 unknowns can be solved with the lowest amount of error. This implies having some motion or change of state on the device. Although it would yield best performance, the 3 pairs do not have to be perfectly orthogonal. Four individual measurements can be rearranged and packed up as a set of linear equations which can be arranged as the following matrix calculation $$\begin{bmatrix} x_{m1} - x_{m2} & y_{m1} - y_{m2} & z_{m1} - z_{m2} \\ x_{m1} - x_{m3} & y_{m1} - y_{m3} & z_{m1} - z_{m3} \\ x_{m1} - x_{m4} & y_{m1} - y_{m4} & z_{m1} - z_{m4} \end{bmatrix} * \begin{bmatrix} x_{off} \\ y_{off} \\ z_{off} \end{bmatrix} =$$

$$1/2 \begin{bmatrix} (x_{m1} - x_{m2})^2 & (y_{m1} - y_{m2})^2 & (z_{m1} - z_{m2})^2 \\ (x_{m1} - x_{m3})^2 & (y_{m1} - y_{m3})^2 & (z_{m1} - z_{m3})^2 \\ (x_{m1} - x_{m4})^2 & (y_{m1} - y_{m4})^2 & (z_{m1} - z_{m4})^2 \end{bmatrix}$$

$$\Delta \vec{o} = Y$$

where $\Delta$ represents matrix representing difference in measured acceleration at different time instances, o is matrix of offsets along 3 axes and Y represents matrix of square of difference of accelerations at different time instances.

In various embodiments, the dynamic offset correction (DOC) computes 3-axis accelerometer biases without needing to know the orientation of the device. Arbitrary output biases can be corrected to ensure consistent performance. In a specific embodiment, a N×3 matrix of every new valid measurement set can be built up to find a multi-level average of measurements for calibration or a 3×3 matrix can be updated with better measurements as they come along to find the best suited measurements for calibration. With the 3×3 matrix, the matrix size will be known and one of man available methods of computing a simple matrix inverse can be used to determine bias values.

In a specific embodiment, the 3×3 matrix method can include fine tuning by checking for geometric diversity and swapping in the best measurements: $\vec{o} = \Delta^{-1} Y$ In a specific embodiment, the N×3 matrix method can include using all valid measurements and solving with an Ordinary Least Squares method: $\vec{o} = [\Delta^T \Delta]^{-1} \Delta^T Y$ Those of ordinary skill in that art will recognize other variations, modifications, and alternatives for solving this set of equations.

FIG. 1 is a simplified flow diagram of a method for calibrating an integrated MEMS device according to an embodiment of the present invention. This processing flow diagram shows the steps discussed previously. In a specific embodiment, the DOC process is used to compute a 3×3 matrix inverse and offset values. This is done by collecting data measurements from the MEMS sensor, in this case a MEMS accelerometer, under various check conditions.

These check conditions include, but are not limited to, whether sufficient time has elapsed since the last measurement, whether a stationary condition of the sensor is met, whether geometric diversity conditions of the collected data are met, whether temperature of the device has remained sufficiently stable, and whether a time/data limit is exceeded. In this embodiment, if the time condition for creating a new measurement point is met, then the stationary check is run. If the stationary check condition is met, then matrix determinants for all hypotheses of row substitutions are computed. This is to determine whether the new measurement is better than any of the existing ones, and to make the substitution as appropriate.

Following the computation of the matrix, if the geometric diversity condition is met, then the 3×3 matrix inverse and offset values are computed. If not, then the time/data limit condition is checked. If the time condition, stationary condition, or time/data limit conditions are not met, then new data is gathered. If the time/data limit condition is met, then a flag for degradation or failed calibration is set. Alternatively, the processing can be allowed to run until calibration conditions are fully met. Other combinations, variations, modifications, and alternatives in this control logic exist.

The calibration may be started right at power up. Averaging the $X_{off}$, $Y_{off}$, and $Z_{off}$ over time can lead to more accurate offset numbers. In some embodiments, while computing the offsets, if dynamic acceleration event happens it can be detected based on large changes in X, Y, or Z and that data point should not be used in the above computation. This calibration method can be tailored to function efficiently for various sensor data rates. For example, at a 256 Hz or higher polling rate, the calibration can require only a few milliseconds per measurement point, leading to adequate calibration in significantly less than one second. Conversely, slower data rates can also be used over larger spans of time to achieve very high accuracy offset estimates.

In various embodiments, a hand motion type calibration technique (used for e-compass calibration on cell phones) can also be used. Such hand motion type calibration techniques can include a figure eight motion, or other like motions.

Another specific method is to hold the device in multiple (e.g four) near orthogonal positions for a short period of time (for example few second or smaller).

In a specific embodiment, the integrated MEMS device can include a 6-axis inertial sensor with a 3-axis gyroscope and a 3-axis accelerometer or a 3 axis accelerometer and 3 axis magnetometer. During a hand motion calibration (e.g. figure eight) for the gyroscope, the accelerometer can also be gathering data points for calibration or other processes. Other types of user-initiated calibration processes will be recognized by those of ordinary skill in the art.

In an alternative embodiment, a simple approach can be described as follows.
1. Read X, Y, Z. When there is no dynamic acceleration (the part is not moving), $X^2+Y^2+Z^2=1$ $g^2$ independent of orientation. Any delta with respect to 1 g is due to offsets of the 3 axes of the sensor and measurement path.
2. In a simple correction, if we assume that the Z-offset is the worst offset (does not necessarily mean it is the largest for all parts), we can apply the delta to Z while post-processing the Z-axis measurement.

Many benefits are achieved by the way of the present invention over conventional techniques. From a user perspective, the DOC implementation can improve measurements to support high performance applications. A DOC process can be intentionally triggered by the user, or it can run in the background. This allows flexibility for the user or manufacturer of the device to determine what is the best fit with the intended usage and performance requirements. The procedural impact of implementation would be quite low, since many users already expect to calibrate a mobile device's magnetometer via a series of movements to achieve peak accuracy. The DOC process can also "auto-detect" when the calibration conditions are met. Additionally, this process can consume very low power, as only an initial calibration routine and then a very low duty cycle maintenance task can be used to improve accuracy over time. From a developer perspective, this implementation in a device can result in lower cost, since no elaborate in-factory calibration is required. This would eliminate the need for putting each part in a known orientation and taking measurements. The device can work regardless of any source or cause of biases.

Example 1

This example describes the calibration of a phone device. A predefined maneuver lasting a few seconds is used to ensure that multiple orientations are exercised with the phone device. This procedure is not tied to putting the full magnitude of gravity on each axis, but rather to automatically sensing that sufficient geometric diversity exists in the measurement points to allow biases on each axis to be computed with acceptable accuracy. This process could either be pushed on a user by a phone manufacturer, or the calibration service could run in the background and simply continue until the device is well calibrated. This second approach could take a long time if the phone is only kept in a pocket, on a table, or if it experiences no stationary time at all in multiple orientations.

In a specific embodiment, the DOC algorithm can know when the geometric diversity of stationary periods of data collection is insufficient to populate a "good" 3×3 matrix. When the geometric diversity is inadequate, the calibration is degraded and less accurate. When there are insufficient periods of "quiet" time, then no calibration is possible. The calibration maneuver, success thresholds, or criteria for determined with the accelerometer is truly only experiencing gravity can be modified.

Regarding phone embodiments of this invention, phone manufacturers will have several options if significant accelerometer biases are present within production parts. Two such options are presented here:
1. Allow a dynamic offset correction maneuver to be triggered by the end user. User must follow a maneuver that will ensure sufficient geometric diversity over the course of its execution, such as holding the device at recommended positions such as near orthogonal positions or at various prescribed positions relative to the body.
2. Run a background dynamic offset correction, which requires a constantly running service until calibration is complete Example 2

This example describes some results from a calibration test for a phone made to be transparent to the user. In this example, the maneuver used to activate the calibration routine involves picking up the phone as if making a call, looking at the "screen", and then placing the phone in a pocket. In 26 tests with a ~6-second maneuver, this basic technique quickly converged biases on all axes to <30 mg, 1-sigma.

In various embodiments, running a dynamic offset calibration process as a background task can further improve the results as the phone, or other device, is used. Depending on tuning and trade-off, a more precise stationary calibration can be used as well, such as a conventional "place phone on a level surface and press a button" type procedure. In a specific embodiment, additional calibration techniques can be used to achieve a <10 mg bias, per axis, 1-sigma.

Example 3

This example describes the calibration of an accelerometer using DOC in an e-Compass device to determine the improvement of the 0 g offset. In this case, the DOC is implemented in software on PIC microcontrollers on PCBs. The initial 0 g offsets were recorded by noting the stable X, Y, Z readings through waiting 3 seconds in all 6 orientations (The DOC algorithm was run as the PCBs are rotated in 4 directions until the DOC algorithm completed. The offsets were then applied by software computation on each sample. The resulting 0 g offset values were then recorded, also by noting the stable X, Y, Z readings through waiting 3 seconds in all 6 orientations. The results show a dramatic improvement of the 0 g offset in the e-Compass device. Based on measured 32 parts, the average+1 sigma values are 8.325 mg for X, 13.988 mg for Y, and 20.567 mg for Z.

In an embodiment, the present invention provides a handheld computer system for processing data from an integrated MEMS device disposed within a hand-held computer system. The system can include a housing, a tangible memory for storing a plurality of executable instructions, an integrated MEMS device including a MEMS sensor disposed within the housing, and a processor disposed within the housing and coupled to the tangible memory and the integrated MEMS device. A sense module can be configured to sense via the MEMS sensor. A correction module can be configured for determining via the processor results of various computational processes as further described below. An offset data module can be configured to compute offset data via the processor through a dynamic offset correction (DOC) process, which is further described below. The processor is programmed to perform a plurality of functions by the plurality of executable instructions. In various specific embodiments, these instructions can include:

executable code that programs the processor to sense, by the MEMS sensor disposed within the computer system, calibration data measurements executable code that programs the processor to determine, with a processor disposed within the computer system, computed offset data for the MEMS sensor through a dynamic offset correction (DOC) process using the calibration data measurements executable code that programs the processor to sense, by the MEMS sensor, X, Y, and Z axis sensor data in at least four static orientations for a predetermined time period executable code that programs the processor to sense, by the MEMS sensor, a plurality of valid data points and executable code that programs the processor to perform the DOC process, wherein the DOC process comprises building an N×3 matrix including the plurality of valid data points and using an Ordinary Least Squares method executable code that programs the processor to sense, by the MEMS sensor, at least four desired data points and executable code that programs the processor to perform the DOC process, wherein the DOC process comprises building a 3×3 matrix including the at least four desired data points executable code that programs the processor to initiate the DOC process in response to a user performing a predetermined maneuver with the hand-held computer system executable code that programs the processor to initiate the DOC process in response to a user performing, with the hand-held computer system, a motion of the user retrieving the hand-held computer system from a first user position, holding the computer system at a second user position, holding the computer system at a third user position, and then returning the computer system to the first user position executable code that programs the processor to run the DOC process constantly as a background DOC process until predetermined calibration conditions are met executable code that programs the processor to run the DOC process constantly as a background DOC process until time period conditions, stationary conditions, geometric diversity conditions, or data limit conditions are met executable code that programs the processor to sense, by the MEMS sensor, user-initiated calibration data measurements as the user places the hand-held computer system on a level surface and presses a button, or as the user performs a figure 8 maneuver, and determining, by the processor, user-initiated computed offset data using the user-initiated calibration data measurements In a specific embodiment, the MEMS sensor can include a MEMS accelerometer and the integrated MEMS device can include an integrated 6-axis MEMS inertial sensing device including the MEMS accelerometer and a MEMS gyroscope. The integrated MEMS device can also include an integrated 6-axis MEMS inertial sensing device including the MEMS accelerometer and a Magnetometer or an integrated 9-axis or 10-axis inertial sensing device including the MEMS accelerometer and a MEMS gyroscope, a magnetometer, and a pressure sensor. There can be other variations, modifications, and alternatives.

Figure 2:
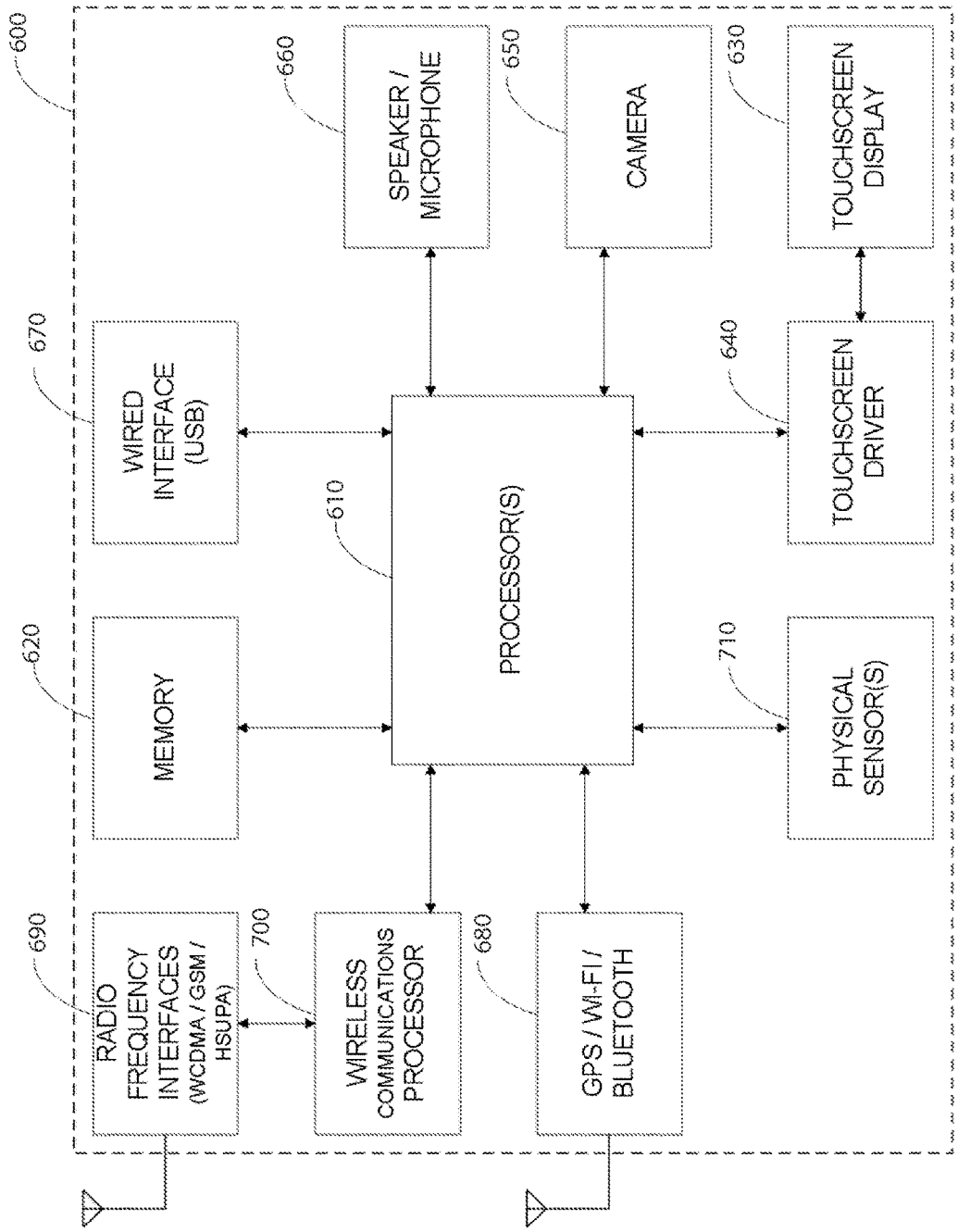
FIG. 2 illustrates a simplified functional block diagram of various embodiments of the present invention.

FIG. 2 illustrates a functional block diagram of various embodiments of the present invention. In FIG. 2, a computing device 600 typically includes an applications processor 610, memory 620, a touch screen display 630 and driver 640, an image acquisition device 650, audio input/output devices 660, and the like. Additional communications from and to computing device are typically provided by via a wired interface 670, a GPS/Wi-Fi/Bluetooth interface 680, RF interfaces 690 and driver 700, and the like. Also included in various embodiments are physical sensors 710.

In various embodiments, computing device 600 may be a hand-held computing device (e.g. Apple iPad, Apple iTouch, Dell Mini slate, Lenovo Skylight/IdeaPad, Asus EEE series, Microsoft Courier, Notion Ink Adam), a portable telephone (e.g. Apple iPhone, Motorola Droid, Google Nexus One, HTC Incredible/EVO 4G, Palm Pre series, Nokia N900), a portable computer (e.g. netbook, laptop), a media player (e.g. Microsoft Zune, Apple iPod), a reading device (e.g. Amazon Kindle, Barnes and Noble Nook), or the like.

Typically, computing device 600 may include one or more processors 610. Such processors 610 may also be termed application processors, and may include a processor core, a video/graphics core, and other cores. Processors 610 may be a processor from Apple (A4), Intel (Atom), NVidia (Tegra 2), Marvell (Armada), Qualcomm (Snapdragon), Samsung, TI (OMAP), or the like. In various embodiments, the processor core may be an Intel processor, an ARM Holdings processor such as the Cortex-A, -M, -R or ARM series processors, or the like. Further, in various embodiments, the video/graphics core may be an Imagination Technologies processor PowerVR-SGX, -MBX, -VGX graphics, an Nvidia graphics processor (e.g. GeForce), or the like. Other processing capability may include audio processors, interface controllers, and the like. It is contemplated that other existing and/or later-developed processors may be used in various embodiments of the present invention.

In various embodiments, memory 620 may include different types of memory (including memory controllers), such as flash memory (e.g. NOR, NAND), pseudo SRAM, DDR SDRAM, or the like. Memory 620 may be fixed within computing device 600 or removable (e.g. SD, SDHC, MMC, MINI SD, MICRO SD, CF, SIM). The above are examples of computer readable tangible media that may be used to store embodiments of the present invention, such as computer-executable software code (e.g. firmware, application programs), application data, operating system data or the like. It is contemplated that other existing and/or later-developed memory and memory technology may be used in various embodiments of the present invention.

In various embodiments, touch screen display 630 and driver 640 may be based upon a variety of later-developed or current touch screen technology including resistive displays, capacitive displays, optical sensor displays, electromagnetic resonance, or the like. Additionally, touch screen display 630 may include single touch or multiple-touch sensing capability. Any later-developed or conventional output display technology may be used for the output display, such as TFT-LCD, OLED, Plasma, trans-reflective (Pixel Qi), electronic ink (e.g. electrophoretic, electrowetting, interferometric modulating). In various embodiments, the resolution of such displays and the resolution of such touch sensors may be set based upon engineering or non-engineering factors (e.g. sales, marketing). In some embodiments of the present invention, a display output port, such as an HDMI-based port or DVI-based port may also be included.

In some embodiments of the present invention, image capture device 650 may include a sensor, driver, lens and the like. The sensor may be based upon any later-developed or convention sensor technology, such as CMOS, CCD, or the like. In various embodiments of the present invention, image recognition software programs are provided to process the image data. For example, such software may provide functionality such as: facial recognition, head tracking, camera parameter control, or the like.

In various embodiments, audio input/output 660 may include conventional microphone(s)/speakers. In some embodiments of the present invention, three-wire or four-wire audio connector ports are included to enable the user to use an external audio device such as external speakers, headphones or combination headphone/microphones. In various embodiments, voice processing and/or recognition software may be provided to applications processor 610 to enable the user to operate computing device 600 by stating voice commands. Additionally, a speech engine may be provided in various embodiments to enable computing device 600 to provide audio status messages, audio response messages, or the like.

In various embodiments, wired interface 670 may be used to provide data transfers between computing device 600 and an external source, such as a computer, a remote server, a storage network, another computing device 600, or the like. Such data may include application data, operating system data, firmware, or the like. Embodiments may include any later-developed or conventional physical interface/protocol, such as: USB 2.0, 3.0, micro USB, mini USB, Firewire, Apple iPod connector, Ethernet, POTS, or the like. Additionally, software that enables communications over such networks is typically provided.

In various embodiments, a wireless interface 680 may also be provided to provide wireless data transfers between computing device 600 and external sources, such as computers, storage networks, headphones, microphones, cameras, or the like. As illustrated in FIG. 2, wireless protocols may include Wi-Fi (e.g. IEEE 802.11a/b/g/n, WiMax), Bluetooth, IR and the like.

GPS receiving capability may also be included in various embodiments of the present invention, however is not required. As illustrated in FIG. 2, GPS functionality is included as part of wireless interface 180 merely for sake of convenience, although in implementation, such functionality is currently performed by circuitry that is distinct from the Wi-Fi circuitry and distinct from the Bluetooth circuitry.

Additional wireless communications may be provided via RF interfaces 690 and drivers 700 in various embodiments. In various embodiments, RF interfaces 690 may support any future-developed or conventional radio frequency communications protocol, such as CDMA-based protocols (e.g. WCDMA), GSM-based protocols, HSUPA-based protocols, or the like. In the embodiments illustrated, driver 700 is illustrated as being distinct from applications processor 610. However, in some embodiments, these functionality are provided upon a single IC package, for example the Marvel PXA330 processor, and the like. It is contemplated that some embodiments of computing device 600 need not include the RF functionality provided by RF interface 690 and driver 700.

FIG. 2 also illustrates computing device 600 to include physical sensors 710. In various embodiments of the present invention, physical sensors 710 can be single axis or multi-axis Micro-Electro-Mechanical Systems (MEMS) based devices being developed by M-cube, the assignee of the present patent application. Physical sensors 710 can include accelerometers, gyroscopes, pressure sensors, magnetic field sensors, bio sensors, and the like. In other embodiments of the present invention, conventional physical sensors 710 from Bosch, STMicroelectronics, Analog Devices, Kionix or the like may be used.

In various embodiments, any number of future developed or current operating systems may be supported, such as iPhone OS (e.g. iOS), WindowsMobile (e.g. 7), Google Android (e.g. 2.2), Symbian, or the like. In various embodiments of the present invention, the operating system may be a multi-threaded multi-tasking operating system. Accordingly, inputs and/or outputs from and to touch screen display 630 and driver 640 and inputs/or outputs to physical sensors 710 may be processed in parallel processing threads. In other embodiments, such events or outputs may be processed serially, or the like. Inputs and outputs from other functional blocks may also be processed in parallel or serially, in other embodiments of the present invention, such as image acquisition device 650 and physical sensors 710.

FIG. 2 is representative of one computing or micro-processing device 600 capable of embodying the present invention. In one embodiment, the DOC can be implanted on chip with sensors instead of using an external processor. The previously described methods of operation can be implemented with on-chip logic or through a micro-processor in the same device or in a separate chip within the hand-held device. It will be readily apparent to one of ordinary skill in the art that many other hardware and software configurations are suitable for use with the present invention. Embodiments of the present invention may include at least some but need not include all of the functional blocks illustrated in FIG. 2. For example, in various embodiments, computing device 600 may lack image acquisition unit 650, or RF interface 690 and/or driver 700, or GPS capability, or the like. Additional functions may also be added to various embodiments of computing device 600, such as a physical keyboard, an additional image acquisition device, a trackball or trackpad, a joystick, or the like. Further, it should be understood that multiple functional blocks may be embodied into a single physical package or device, and various functional blocks may be divided and be performed among separate physical packages or devices.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A system comprising:
a hand held computer device;
an integrated MEMS device disposed within the hand held computer device; and
a processor for processing data from the integrated MEMS device;
wherein the system is configured to:
determine, by the processor using the integrated MEMS device, that the hand held computer device has been stationary in a first position over a predetermined period of time; and
take a first measurement data, using the integrated MEMS device, with the hand held computer device in the first position;
determine, by the processor using the integrated MEMS device, that the hand held computer device has been stationary in a second position over the predetermined period of time; and
take a second measurement data, using the integrated MEMS device, with the hand held computer device in the second position;
determine, by the processor using the integrated MEMS device, that the hand held computer device has been stationary in a third position over the predetermined period of time; and
take a third measurement data, using the integrated MEMS device, with the hand held computer device in the third position;
determine, by the processor using the integrated MEMS device, that the hand held computer device has been stationary in a fourth position over the predetermined period of time; and
take a fourth measurement data, using the integrated MEMS device, with the hand held computer device in the fourth position;
wherein the first, second, third, and fourth measurement data taken at the first, second, third, and fourth positions, respectively, are uncorrelated with one another;
and
determine, using the processor, offset data for each of X-axis, Y-axis, and Z-axis using the first, second, third, and fourth measurement data; and
correct subsequent measurement data using the offset data for each of X-axis, Y-axis, and Z-axis to improve accuracy of measured sensor data;
wherein accuracy of measured sensor data is improved by taking the first, second, third, and fourth measurement data when the hand held computer device is stationary during normal operation without needing to know the orientation of the device, and the correcting of subsequent measurement data using the offset data is carried out dynamically during normal operation.

2. The system of claim 1, wherein the system is further configured to:
take measurement data, using the integrated MEMS device, without subjecting the hand held computer device in a stationary condition;
correct subsequent measurement data using the offset data for each of the X-axis, Y-axis, and Z-axis.

3. The system of claim 1 wherein the measurement data include at least four data points, and wherein the determining of offset data comprises building a 3×3 matrix including the at least four data points.

4. The system of claim 1 wherein the determining of offset data is configured as a background process that constantly runs until geometric diversity conditions are met.

5. The system of claim 1 wherein the geometric diversity conditions are modified over time to improve accuracy after an initial period of convergence or completion using less stringent conditions.

6. The system of claim 1 further comprising a user-initiated calibration process including sensing, by the integrated MEMS device, user-initiated calibration data measurements as the user places the hand held computer device on a level surface and presses a button, or as the user performs a figure 8 maneuver in which the user moves the hand held computer device in a path having a shape resembling the number "8," and determining user-initiated computed offset data using the user-initiated calibration data measurements.

7. The system of claim 1 wherein the integrated MEMS device comprises an integrated 3-axis MEMS accelerometer, or a 6-axis MEMS inertial sensing device including the MEMS accelerometer and a MEMS gyroscope, or 6-axis device including the MEMS accelerometer and a MEMS magnetometer.

8. The system of claim 1 wherein the determining of offset data comprises solving a matrix equation of the form:

$$\Delta \vec{o} = Y$$

where $\Delta$ represents a matrix representing difference in measured acceleration at different time instances, o is a matrix of offsets along 3 axes, and Y represents a matrix of square of difference of accelerations at different time instances.

9. The method of claim 8, wherein the matrix equation comprises the following set of linear equations, $$\begin{bmatrix} x_{m1}-x_{m2} & y_{m1}-y_{m2} & z_{m1}-z_{m2} \\ x_{m1}-x_{m3} & y_{m1}-y_{m3} & z_{m1}-z_{m3} \\ x_{m1}-x_{m4} & y_{m1}-y_{m4} & z_{m1}-z_{m4} \end{bmatrix} * \begin{bmatrix} x_{off} \\ y_{off} \\ z_{off} \end{bmatrix} =$$

$$1/2 \begin{bmatrix} (x_{m1}-x_{m2})^2 & (y_{m1}-y_{m2})^2 & (z_{m1}-z_{m2})^2 \\ (x_{m1}-x_{m3})^2 & (y_{m1}-y_{m3})^2 & (z_{m1}-z_{m3})^2 \\ (x_{m1}-x_{m4})^2 & (y_{m1}-y_{m4})^2 & (z_{m1}-z_{m4})^2 \end{bmatrix}$$

wherein:
$x_{mi}$, $y_{mi}$, $z_{mi}$ are measured static accelerations from only gravity at instance i, with i=1 to 4; and
$x_{off}$, $y_{off}$, $z_{off}$ are the offsets on each of the 3 axes, respectively.

10. The system of claim 1 wherein the hand held computer device comprises a consumer device.

11. The system of claim 1 wherein correction module comprise a processor located on the same device as MEMS device or different device, on-chip logic, or software.

12. The system of claim 1 wherein measurement data comprise calibration data or measurement data.

13. An inertial sensor system for processing data from an integrated MEMS device, the inertial sensor system comprising:
a housing;
a non-transitory computer tangible memory for storing a plurality of non-transitory executable codes;
an integrated MEMS device disposed within the housing, the integrated MEMS device including a MEMS sensor;
a processor disposed within the housing and coupled to the tangible memory and the integrated MEMS device, wherein the processor is programmed to perform a plurality of functions by a plurality of non-transitory executable instructions;
wherein the inertial sensor system is configured to:
determine, by the processor using the integrated MEMS device, that integrated MEMS device has been stationary in a first position over a predetermined period of time; and
take a first measurement data, using the integrated MEMS device, with the integrated MEMS device in the first position;
determine, by the processor using the integrated MEMS device, that the integrated MEMS device has been stationary in a second position over the predetermined period of time; and
take a second measurement data, using the integrated MEMS device, with the integrated MEMS device in the second position;
determine, by the processor using the integrated MEMS device, that the integrated MEMS device has been stationary in a third position over the predetermined period of time; and
take a third measurement data, using the integrated MEMS device, with the integrated MEMS device in the third position;
determine, by the processor using the integrated MEMS device, that integrated MEMS device has been stationary in a fourth position over the predetermined period of time; and
take a fourth measurement data, using the integrated MEMS device, with the integrated MEMS device in the fourth position;
wherein the first, second, third, and fourth measurement data taken at the first, second, third, and fourth positions, respectively, are uncorrelated with one another;
and
determine, using the processor, offset data for each of X-axis, Y-axis, and Z-axis using the first, second, third, and fourth measurement data; and
correct subsequent measurement data using the offset data for each of X-axis, Y-axis, and Z-axis to improve accuracy of measured sensor data;
wherein accuracy of measured sensor data is improved by taking the first, second, third, and fourth measurement data when the hand held computer device is stationary during normal operation without needing to know the orientation of the device, and the correcting of subsequent measurement data using the offset data is carried out dynamically during normal operation.

14. The system of claim 13, wherein determining, by the processor, that the integrated MEMS device has been stationary comprises determining that measured sensor data has not changed over the predetermined period of time, in which gravity is a dominant acceleration component being sensed by the device.

15. The system of claim 14, wherein the predetermined period of time is 200 ms.

16. The system of claim 13 wherein the plurality of non-transitory executable instructions comprises:
   executable code that programs the processor to initiate the determining of offset data in response to a user performing a predetermined maneuver with the inertial sensor system,
   executable code that programs the processor to run the determining of offset data constantly as a background process until time period conditions, stationary conditions, geometric diversity conditions, or data limit conditions are met, or
   executable code that programs the processor to initiate the determining of offset data in response to a user performing, with the inertial sensor system, a motion of the user retrieving the inertial sensor system from a first user position, holding inertial sensor system at a second user position, holding the inertial sensor system at a third user position, and then returning the inertial sensor system to the first user position.

17. The system of claim 13 wherein the plurality of non-transitory executable instructions comprises:
   executable code that programs the processor to sense, by the MEMS sensor, user-initiated calibration data measurements as the user places the integrated MEMS device on a level surface and presses a button, or as the user performs a figure 8 maneuver in which the user moves the inertial sensor system in a path having a shape resembling the number "8", and determining, by the processor, user-initiated computed offset data using the user-initiated calibration data measurements.

18. The system of claim 13 wherein the MEMS sensor comprises a MEMS accelerometer and the integrated MEMS device comprises:
   an integrated 6-axis MEMS inertial sensing device including the MEMS accelerometer and a MEMS gyroscope,
   an integrated 6-axis MEMS inertial sensing device including the MEMS accelerometer and a Magnetometer or an integrated 9-axis,
   or a 10-axis inertial sensing device including the MEMS accelerometer and a MEMS gyroscope, a magnetometer, and a pressure sensor.

19. The system of claim 13 wherein the determining of offset data comprises solving a matrix equation:

$$\Delta \vec{o} = Y$$

where $\Delta$ represents a matrix representing difference in measured acceleration at different time instances, o is a matrix of offsets along 3 axes, and Y represents a matrix of square of difference of accelerations at different time instances.

20. The method of claim 19, wherein the matrix equation comprises the following set of linear equations, $$\begin{bmatrix} x_{m1} - x_{m2} & y_{m1} - y_{m2} & z_{m1} - z_{m2} \\ x_{m1} - x_{m3} & y_{m1} - y_{m3} & z_{m1} - z_{m3} \\ x_{m1} - x_{m4} & y_{m1} - y_{m4} & z_{m1} - z_{m4} \end{bmatrix} * \begin{bmatrix} x_{off} \\ y_{off} \\ z_{off} \end{bmatrix} =$$

$$1/2 \begin{bmatrix} (x_{m1} - x_{m2})^2 & (y_{m1} - y_{m2})^2 & (z_{m1} - z_{m2})^2 \\ (x_{m1} - x_{m3})^2 & (y_{m1} - y_{m3})^2 & (z_{m1} - z_{m3})^2 \\ (x_{m1} - x_{m4})^2 & (y_{m1} - y_{m4})^2 & (z_{m1} - z_{m4})^2 \end{bmatrix}$$

wherein:
   $x_{mi}$, $y_{mi}$, $z_{mi}$ are measured static accelerations from only gravity at instance i, with i=1 to 4; and
   $x_{off}$, $y_{off}$, $z_{off}$ are the offsets on each of the 3 axes, respectively.

21. The system of claim 13 wherein the inertial sensor system is a hand-held system.

22. A method for processing data from an integrated MEMS device disposed within a computer device, the method comprising:
   disposing, by a user, the computer device in a first position;
   determining, by the computer device using the integrated MEMS device, that the computer device has been stationary in the first position over a predetermined period of time;
   determining a first measurement data using the integrated MEMS device with the computer device in the first position;
   disposing, by the user, the computer device in a second position;
   determining, by the computer device using the integrated MEMS device, that the computer device has been stationary in the second position over the predetermined period of time;
   taking a second measurement data using the integrated MEMS device with the computer device in the second position;
   disposing, by the user, the computer device in a third position;
   determining, by the computer device using the integrated MEMS device, that the computer device has been stationary in the third position over the predetermined period of time;
   determining a third measurement data using the integrated MEMS device with the computer device in the third position;
   disposing, by the user, the computer device in a fourth position;
   determining, by the computer device using the integrated MEMS device, that the computer device has been stationary in the fourth position over the predetermined period of time;
   determining a fourth measurement data using the integrated MEMS device with the computer device in the fourth position;
   determining offsets for each of X-axis, Y-axis, and Z-axis using the first, second, third, and fourth measurement data;
   wherein the first, second, third, and fourth measurement data taken at the first, second, third, and fourth positions, respectively, are uncorrelated with one another; and
   using the determined offsets for each of X-axis, Y-axis, and Z-axis to correct subsequent measurements with the integrated MEMS device to improve accuracy of measured sensor data;
   wherein accuracy of measured sensor data is improved by taking the first, second, third, and fourth measurement data when the hand held computer device is stationary during normal operation without needing to know the orientation of the device, and the correcting of subsequent measurement data using the offset data is carried out dynamically during normal operation.

23. The method of claim 22 wherein the calibration data measurements include at least four data points, and wherein the determining of offset data comprises building a 3×3 matrix including the at least four data points.

24. The method of claim 22 wherein determining offset data is initiated by a user performing a predetermined maneuver with the computer device;
wherein the predetermined maneuver comprises a motion of the user retrieving inertial sensor system from a first user position, holding the inertial sensor system at a second user position, holding the computer device at a third and then fourth user position.

25. The method of claim 22 wherein the determining of offset data is configured as a background process that constantly runs until geometric diversity conditions are met.

26. The method of claim 25 wherein the geometric diversity conditions are modified over time to improve accuracy after an initial period of convergence or completion using less stringent conditions.

27. The method of claim 22 further comprising a user-initiated calibration process including sensing, by the integrated MEMS device, user-initiated calibration data measurements as the user places the computer device on a level surface and presses a button, or as the user performs a figure 8 maneuver in which the user moves the computer device in a path having a shape resembling the number "8", and determining, by the computer device, user-initiated computed offset data using the user-initiated calibration data measurements.

28. The method of claim 22 wherein the integrated MEMS device comprises an integrated 3-axis MEMS accelerometer, or a 6-axis MEMS inertial sensing device including the MEMS accelerometer and a MEMS gyroscope, or 6-axis device including the MEMS accelerometer and a MEMS magnetometer.

29. The method of claim 22 wherein determining of offset data comprises solving a matrix equation of the form:

$$\Delta \vec{o} = Y$$

where $\Delta$ represents a matrix representing difference in measured acceleration at different time instances, o is a matrix of offsets along 3 axes, and Y represents a matrix of square of difference of accelerations at different time instances.

30. The method of claim 29, wherein the matrix equation comprises the following set of linear equations, $$\begin{bmatrix} x_{m1} - x_{m2} & y_{m1} - y_{m2} & z_{m1} - z_{m2} \\ x_{m1} - x_{m3} & y_{m1} - y_{m3} & z_{m1} - z_{m3} \\ x_{m1} - x_{m4} & y_{m1} - y_{m4} & z_{m1} - z_{m4} \end{bmatrix} * \begin{bmatrix} x_{off} \\ y_{off} \\ z_{off} \end{bmatrix} =$$

$$1/2 \begin{bmatrix} (x_{m1} - x_{m2})^2 & (y_{m1} - y_{m2})^2 & (z_{m1} - z_{m2})^2 \\ (x_{m1} - x_{m3})^2 & (y_{m1} - y_{m3})^2 & (z_{m1} - z_{m3})^2 \\ (x_{m1} - x_{m4})^2 & (y_{m1} - y_{m4})^2 & (z_{m1} - z_{m4})^2 \end{bmatrix}$$

wherein:

$x_{mi}$, $y_{mi}$, $z_{mi}$ are measured static accelerations from only gravity at instance i, with i=1 to 4; and $x_{off}$, $y_{off}$, $z_{off}$ are the offsets on each of the 3 axes, respectively.

* * * * *